United States Patent [19]

Burnell

[11] Patent Number: 5,019,113
[45] Date of Patent: May 28, 1991

[54] ROTARY LAWN MOWER BLADE ASSEMBLY

[76] Inventor: John F. Burnell, 423 Cedar Dr., Lanoka Harbor, N.J. 08734

[21] Appl. No.: 520,266

[22] Filed: May 7, 1990

[51] Int. Cl.$^5$ .................. A01D 34/73; A01D 34/82
[52] U.S. Cl. .................................. 56/295; 56/17.5; 56/DIG. 17
[58] Field of Search ............ 56/255, 295, 12.1, 17.5, 56/DIG. 9, DIG. 17

[56] References Cited

U.S. PATENT DOCUMENTS

| | | | |
|---|---|---|---|
| 2,889,677 | 6/1959 | Wood | 56/295 |
| 3,320,733 | 5/1967 | Kirk | 56/295 |
| 3,563,015 | 2/1971 | Renfroe | 56/295 |
| 3,683,606 | 8/1972 | Staines | 56/295 |
| 3,949,541 | 4/1976 | Henry | 56/295 |
| 4,375,148 | 3/1983 | Beck | 56/295 |
| 4,445,315 | 5/1984 | Roszkowski | 56/295 |
| 4,750,320 | 6/1988 | Liebl | 56/295 |
| 4,779,407 | 10/1988 | Pattee | 56/295 |

*Primary Examiner*—George A. Suchfield
*Attorney, Agent, or Firm*—Norman E. Lehrer; Franklyn Schoenberg

[57] ABSTRACT

A rotatable blade assembly suitable for use on a rotary power lawn mower is provided having an elongated bar member adapted to rotate in a substantially horizontal plane within the housing of a rotary lawn mower to which is detachably secured at diametrically opposed ends thereof cutting blade elements having cutting edges formed at oppositely facing edges which can be secured to the bar member without the need for special tools for removing the blade assembly from the shaft of the mower motor.

5 Claims, 2 Drawing Sheets

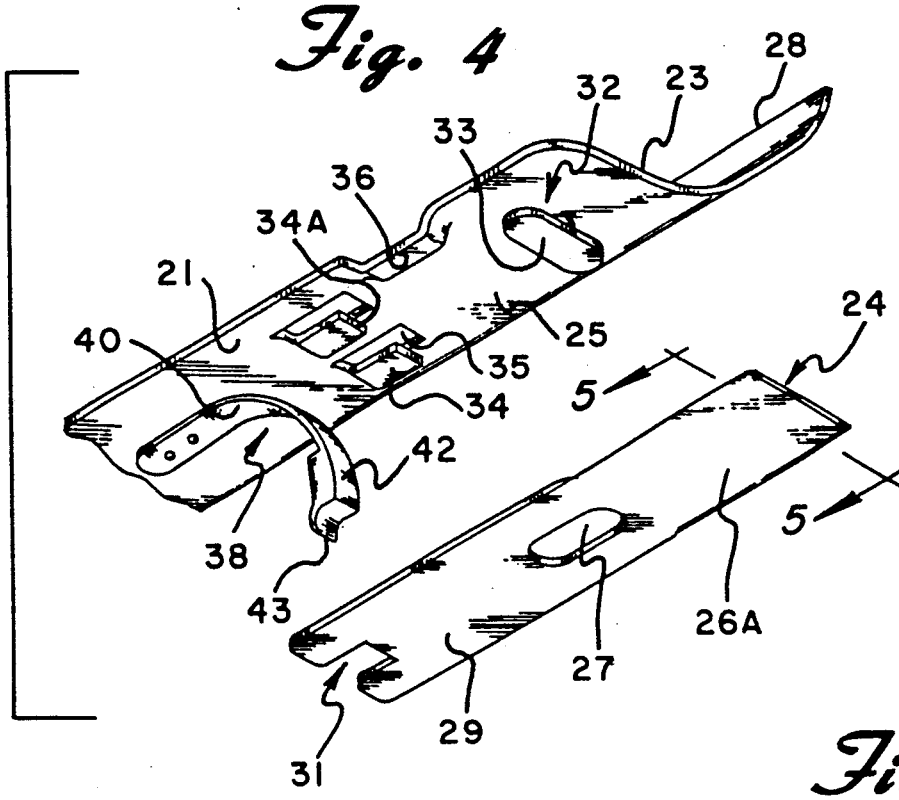
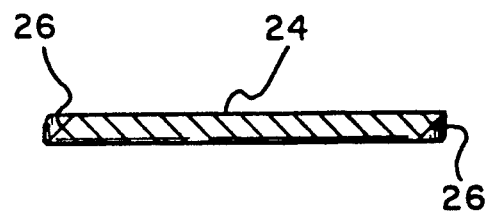
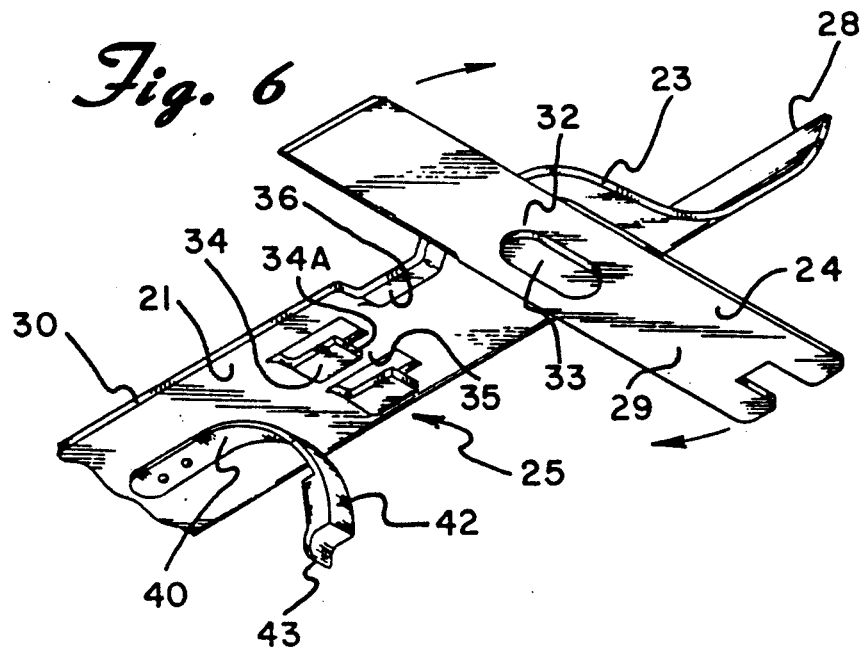

ROTARY LAWN MOWER BLADE ASSEMBLY

FIELD OF THE INVENTION

The present invention relates to rotary lawn mower blades and, more particularly, to rotary power lawn mower blade assemblies having readily replaceable grass cutting edges.

BACKGROUND OF THE INVENTION

Rotary power lawn mowers are widely used by homeowners and the like for cutting grass to maintain the appearance of the lawns about residences, etc. Such mowers typically employ an elongated blade of unitary construction having cutting edges at opposing distal ends thereof which is adapted for rotating horizontally at high speed within a housing intended to prevent injury to the user and to control the direction of discharge of grass clippings and other debris that may be encountered during operation of the mower. The mower blade is, in general, centrally mounted on a shaft vertically extending through the housing from a gasoline or electric powered motor secured to top of the housing.

It is well known that the effectiveness of the mower for cutting grass generally depends on the sharpness of the cutting edges located at each end of the rotating blade as well as on the balance of the rotating blade. Due to the high speed of rotation at which cutting blades of rotary type lawn mowers are operated and the close proximity of the blade to stones, tree roots and the like on the ground, frequent maintenance of the blade sharpness and balance is required for grass cutting effectiveness. Heretofore, such maintenance typically required removal of the blade from the motor shaft for sharpening, straightening, balancing, etc., and then, of course, remounting on the mower.

Numerous suggestions have been made over the years relating to means for sharpening the rotary mower blades and/or replacing the cutting edges thereof without removing the blade from its mounting on the motor shaft, such as disclosed, for example, in U.S. Pat. Nos. 3,101,629; 3,243,944; 3,447,291; 3,563,015; 3,683,606; 3,782,039; 3,762,138; 3,949,541; 4,043,104; 4,229,933; 4,285,169; 4,375,148; 4,471,603; 4,509,316; 4,594,843; 4.651,510; 4,715,173; and 4,750,320. However, the prior art disclosures generally involve blade sharpening devices that incorporate additional structures on the mower which are costly and complex and/or various types of blade assemblies with detachable cutting edges that generally employ specially configured mounting blades and/or cutting members which require special tools, separate fastening means and/or a significant amount of manipulation by the user to assure the safety of their use. Accordingly, the desirability of a blade assembly configuration that would provide means for quickly replacing and securely mounting the cutting edges of a rotary lawn mower blade without the need for special tools and, preferably, would provide more than one set of replacement cutting edges would be evident.

SUMMARY OF THE INVENTION

It is an object of the present invention to provide a rotatable blade having cutting edges that is adaptable for use on a rotary power lawn mower for cutting grass and wherein the cutting edges of the blade can be readily maintained without the need for special tools or removing the blade from its mounting on the mower motor.

It is another object of the present invention to provide a blade assembly for a rotary power lawn mower which includes means for readily replacing the grass cutting edges thereof without removing the blade assembly from its mounting on the motor shaft or requiring the use of special tools.

It is a further object of the present invention to provide a blade assembly for a rotary power lawn mower having at least two sets of grass cutting edges.

It is a still further object of the present invention to provide a blade assembly for a rotary power lawn mower wherein the grass cutting edges thereof can be readily removed and/or replaced without removing the blade assembly from its mounting on the motor shaft.

It is yet another object of the present invention to provide a rotatable blade assembly for a rotary power lawn mower wherein the grass cutting edges thereof can be readily removed and sharpened without removing the blade assembly from its mounting on the motor shaft.

In accordance with the present invention there is provided a rotatable blade assembly for a rotary power lawn mower wherein the grass cutting edges thereof can be readily maintained without the need for removal of the blade from the shaft of a drive motor which comprises:

an elongated bar member adapted for rotating in a substantially horizontal plane about an aperture formed centrally therethrough having means for detachably securing cutting element means to one surface of diametrically opposed end portions of said bar member; and cutting element means which is adapted for being readily detachably secured to said diametrically opposed end portions of said bar member with oppositely directed grass cutting edges being operatively disposed for cutting grass during operation of a rotary power mower, wherein said cutting element means are detachably secured to said bar member without the need for special tools or removing said bar member from the shaft of a rotary mower motor.

Other objects, features and advantages will be readily apparent from the following detailed description of certain preferred embodiments thereof taken in conjunction with the drawing.

BRIEF DESCRIPTION OF THE DRAWINGS

For the purposes of illustrating the invention, there is shown in the accompanying drawings one embodiment which is presently preferred; it being understood that the invention is not limited to the precise arrangements and instrumentalities shown.

FIG. 4 is an enlarged exploded view in perspective, part broken away, of one end of a blade assembly in accordance with the invention;

FIG. 5 is a sectional view taken along line 5—5 of FIG. 4; and

FIG. 6 is an enlarged view in perspective, part broken away, of t blade assembly of FIG. 4.

DESCRIPTION OF THE PREFERRED EMBODIMENT

Figure 2:
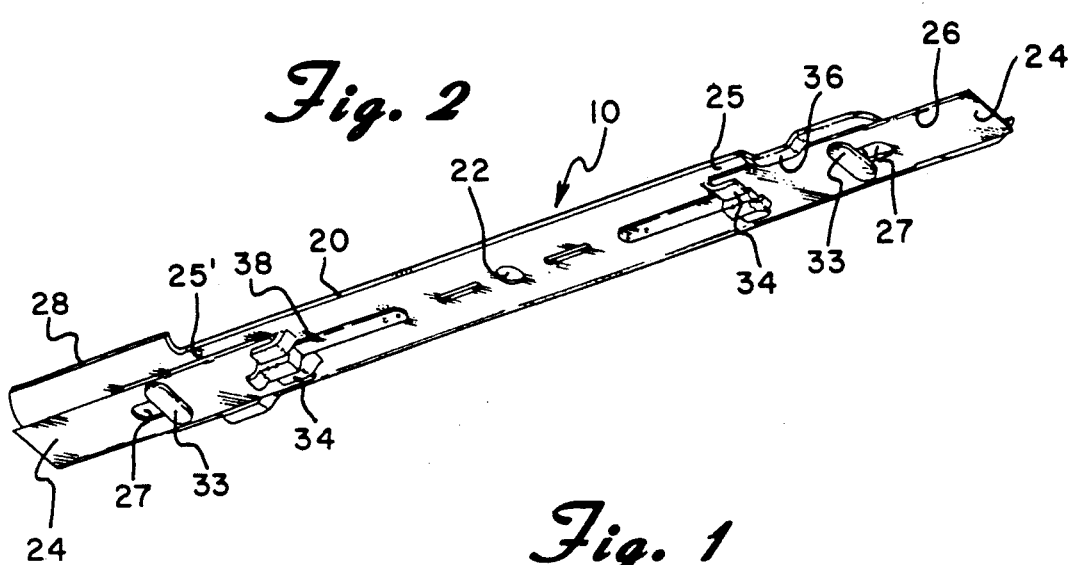
FIG. 2 is a bottom view, in perspective, of a rotary mower blade assembly in accordance with the invention.
Figure 1:
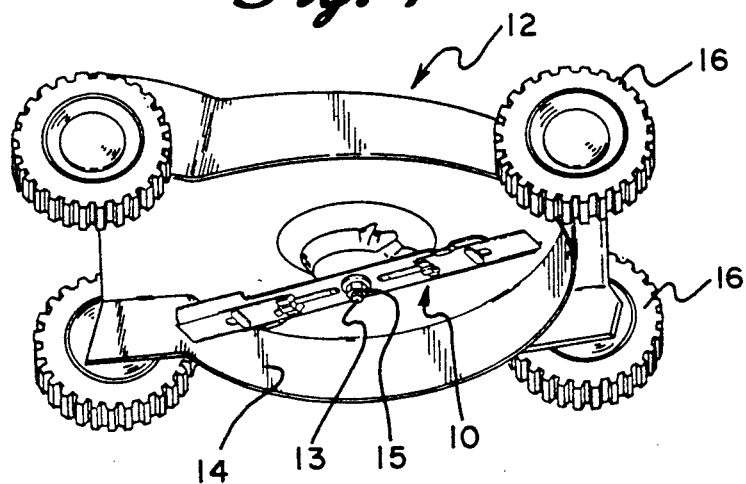
FIG. 1 is the perspective view of the housing or skirt-like guard of a rotary power lawn mower illustrating a blade assembly in accordance with the invention mounted on the motor drive shaft of the rotary lawn mower.
Figure 3:
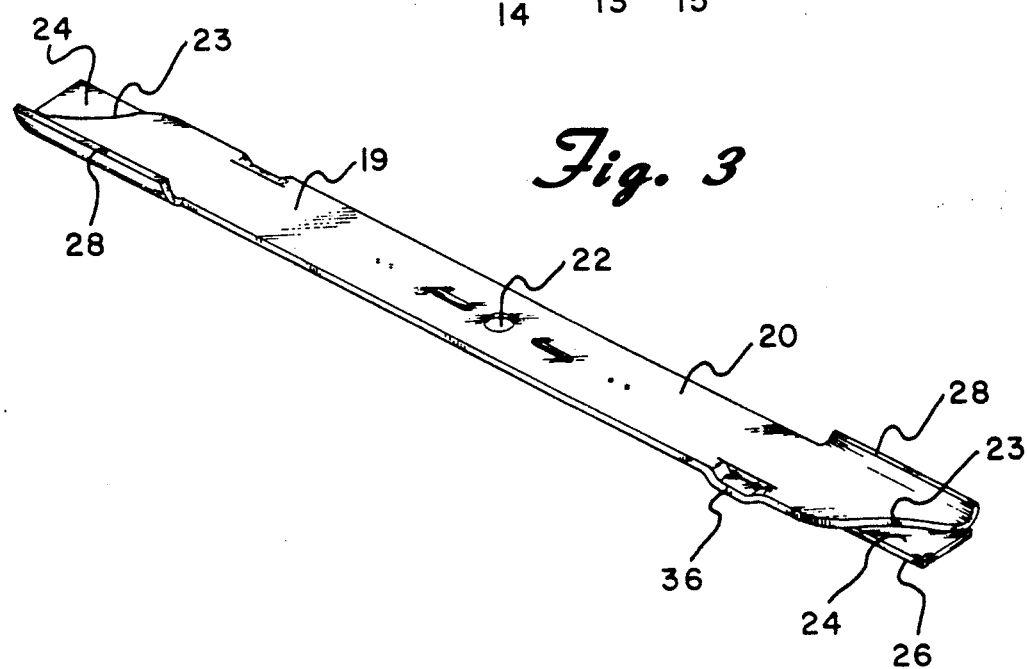
FIG. 3 is a plan view, in perspective, of the blade assembly of FIG. 2.

Referring now to the drawings, where like reference numerals identify like parts, there is illustrated in FIGS. 1-3 a blade assembly in accordance with the present invention shown generally as 10, as it appears when installed on a conventional rotary type power lawn mower 12 having a housing or skirt-like guard 14 supported for movement on wheels 16 which can be advanced by a user over a lawn surface to be mowed (FIG. 1). The blade assembly 10 is depicted as being detachably secured on the shaft 13 of a gasoline or electric powered motor (not shown) for rotation in a horizontal plane within the housing 14. The motor is mounted on the top of the housing 14 with the shaft 13 thereof extending through the housing and the aperture 22 in the blade assembly 10, with the blade assembly being fixed against rotation on the shaft 13 by a suitable nut 15. The mower housing 14 not only serves to protect the user of the mower from contact with the rapidly rotating mower blade and from debris on the ground that may be "kicked-up" during operation of the mower, but also provides in conjunction with the upward vacuuming action created by the rotating blade means for directing the discharge of the grass clippings and the like.

Blade assembly 10 is comprised of an elongated bar member 20 and two separable cutting blade elements 24 which are securely but detachably affixed in a substantially overlying relationship with the diametrically opposite end portions 25, 25' of the bar member 20. Grass cutting edges 26 of the cutting blade elements 24 project beyond oppositely directed obliquely configured ends 23 of the bar member 20.

Bar member 20 is an elongated, rigid member that may be fabricated from a low carbon steel and the like which is provided with a centrally formed aperture 22 therethrough for securing the blade assembly 10 to the end of the drive shaft 13 of a gasoline or electric powered motor (not shown). Bar member 20, and thereby blade assembly 10, rotates with the motor shaft 13 of the lawn mower and it is assumed that the blade assembly 10 rotates in a counterclockwise direction with respect to the view shown in FIG. 1 of the drawing. Elongated bar member 20 has a substantially flat upward facing surface 19 with the trailing edges 28 of the diametrically opposite end portions 25, 25' thereof being upturned in a conventional manner by virtue of which an upward vacuuming action is created by the rotating blade for lifting the grass to facilitate the cutting thereof and of directing the discharge of the grass clippings. The distal ends 23 of the bar member 20 extending between the trailing edges 28 and leading edges 30 of the end portions 25, 25' of bar member 20 are obliquely cut in opposite directions as shown. As indicated, the oppositely directed cutting edges 23 of the cutting blade elements 24 project beyond the obliquely configured ends 23.

For securing cutting elements 24, each end portion 25, 25' of the bar member 20 is provided with a pair of spaced pocket forming tab members 34 with open receiving ends 34A aligned transverse to the longitudinal axis of the blade member 20 and disposed toward the distal ends 23 of the bar member 20; a male pin member 32 radially outwardly aligned with said pair of pocket tab members 34; a stop member 36; and a blade locking assembly 38, all of which project outwardly from the bottom surface 21 of the bar member 20. Secured to the end of the pin member 32 and spaced from the bottom surface 21 of the bar member 20 is an oblong shaped head 33, the main axis of which is transverse to the longitudinal axis of the bar member 20. The blade locking assembly 38 is composed of a hardened steel or the like leaf spring element 40 secured at one end to the bar member 20 in radial alignment with the space 35 between spaced pocket forming tab members 34 and having locking element 42 secured to the free end which is disposed in register with space 35 between tab members 34 to engage with said tab members 34 and a blade element 24 when the blade member is in proper position in the respective pocket means. Advantageously, locking element 42 secured to the end of blade locking assembly 38 has a finger piece 43 extending therefrom so that the leaf spring can be moved from engagement with the tab members 34. The stop member 36 project outwardly along the leading edge 30 of the bar member 20 intermediate the tab members 34 and the distal end 23.

Cutter blade elements 24 are substantially flat metal plates with a cutting edge end portion 26A having oppositely facing sharpened edges 26, a centrally formed longitudinal slot and a shank end portion 29 with a slot 31 extending inwardly from the end thereof adapted for being in register with the spacing 35 between tab members 34.

Referring now to FIGS. 4-6, there is shown in detail the means by which the cutting blade elements 24 are affixed to the bar member 20. The centrally formed longitudinal slot 27 in cutter blade element 24 is complementary in size with the head 33 of male pin 32 extending outwardly from the surface 21 of the bar member 20. The blade element 24 is mounted over the pin member 32 and then rotated thereabout until the shank end 29 of the blade element 24 are slidably engaged with the pocket forming tabs 34. The slot 31 in the shank end of the blade element 24 register with the spacing 35 between the tab members 34 when the blade element is in proper position in the respective pocket means formed by said tab members. Locking element 42 mounted on the free end of blade locking assembly 38 is provided for insertion into the spacing 35 between tab members 34 and the slot 31 in the end of blade element 24 for locking the blade element in place. The pin head 33, tab members 34, stop member 36 and locking element 42 are so arranged that vertical, longitudinal and lateral movement between the bar member 20 and blade element 24 are restricted.

Having thus described the invention in relation to the drawings hereof, it will be clear that modifications could be made in the preferred embodiment without departing from the spirit of the invention. Accordingly, it is not intended that the words used to describe the invention be limiting thereof nor should the drawings be considered so. It is intended that the invention be limited only by the scope of the appended claims.

What is claimed is:

1. A rotatable blade assembly for a rotary power lawn mower which comprises:
   (a) an elongated bar member adapted to rotate in a substantially horizontal plane about an aperture formed centrally therethrough having means for detachably securing cutting element means to one surface of diametrically opposed end portions of said bar member which includes tab pocket forming means, pin means having an oblong shaped head spaced from the surface of said bar member and blade locking means in associated relationship extending from said surface of the bar member; and (b) cutting element means having a centrally formed longitudinal slot therethrough of complementary size to the oblong shaped head of said pin means which are adapted for being readily detachably secured to said diametrically opposed end portions of said bar member with oppositely directed grass cutting edges being operatively disposed for cutting grass during operation of a rotary power mower, wherein said cutting element means are detachably secured to said bar member without the need for special tools or removing said bar member from the shaft of a rotary mower motor.

2. The rotatable blade assembly according to claim 1, wherein said blade locking means comprises a leaf spring element secured at one end of the surface of said bar member having blade locking means secured to the free end thereof which is disposed to engage said blade element when mounted on said pin means.

3. The rotatable blade assembly according to claim 1, wherein said cutting element means has a cutting edge and portion having oppositely facing cutting edges.

4. A rotatable blade assembly for a rotary power lawn mower which comprises:

(a) an elongated bar member adapted to rotate in a substantially horizontal plane about an aperture formed centrally therethrough having means for detachably securing cutting element means to one surface of diametrically opposed end portions of said bar member which includes spaced pocket forming tab means, pin means and blade locking means in associated relationship extending from said surface of the bar member; and (b) cutting element means adapted for being readily detachably secured in a substantially overlying relationship to said diametrically opposed end portions of said bar member with oppositely directed grass cutting edges being operatively disposed for cutting grass during operation of a rotary power mower, wherein said cutting element means are detachably secured to said bar member without the need for special tools or removing said bar member from the shaft of a rotary mower motor.

5. The rotatable blade assembly according to claim 4, wherein said cutting element means has a cutting edge end portion with oppositely facing cutting edges.

* * * * *